March 25, 1958     E. C. CARLSON ET AL     2,827,747
MOWER WITH TILTING MECHANISM
Filed June 20, 1955     2 Sheets-Sheet 1
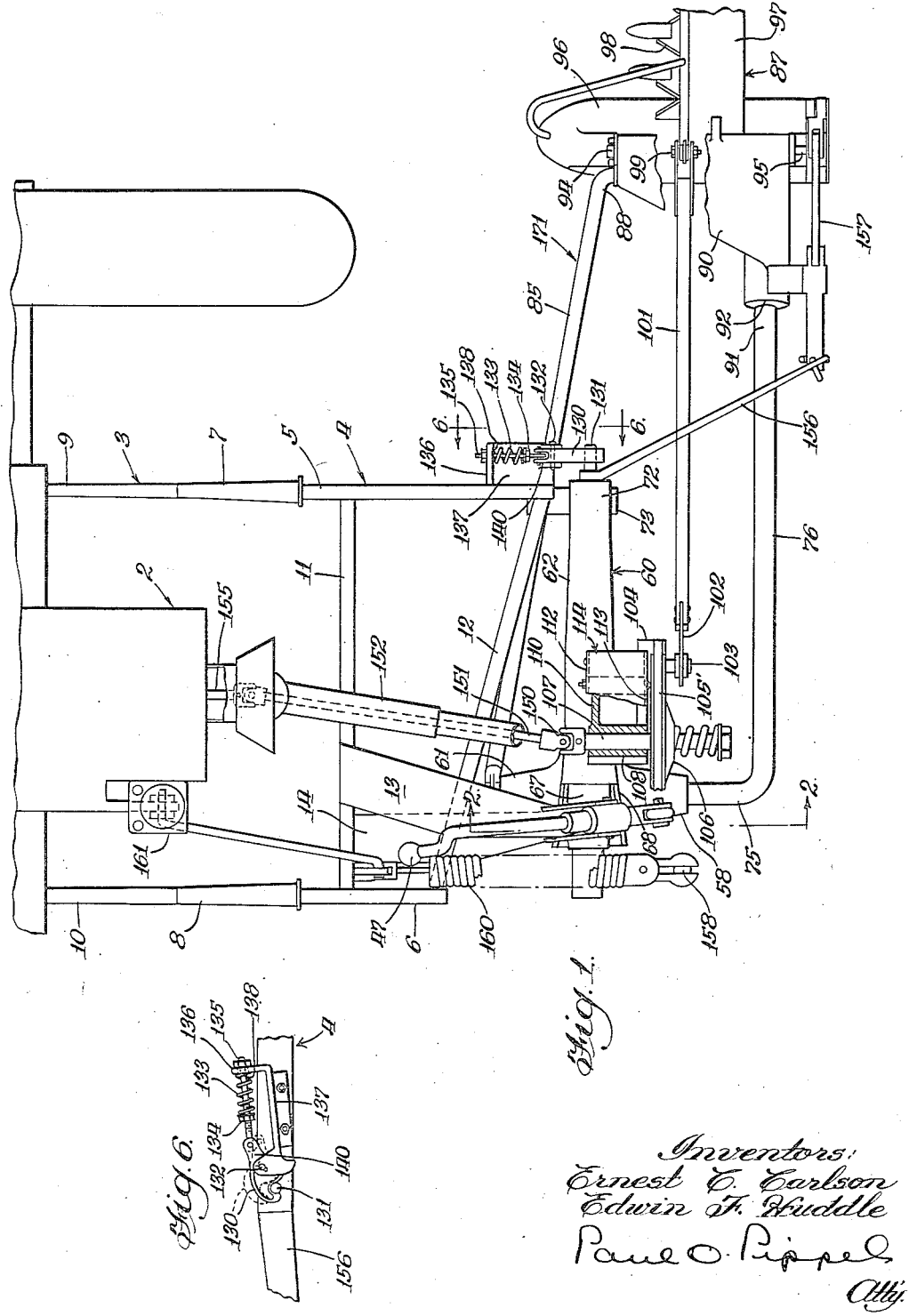

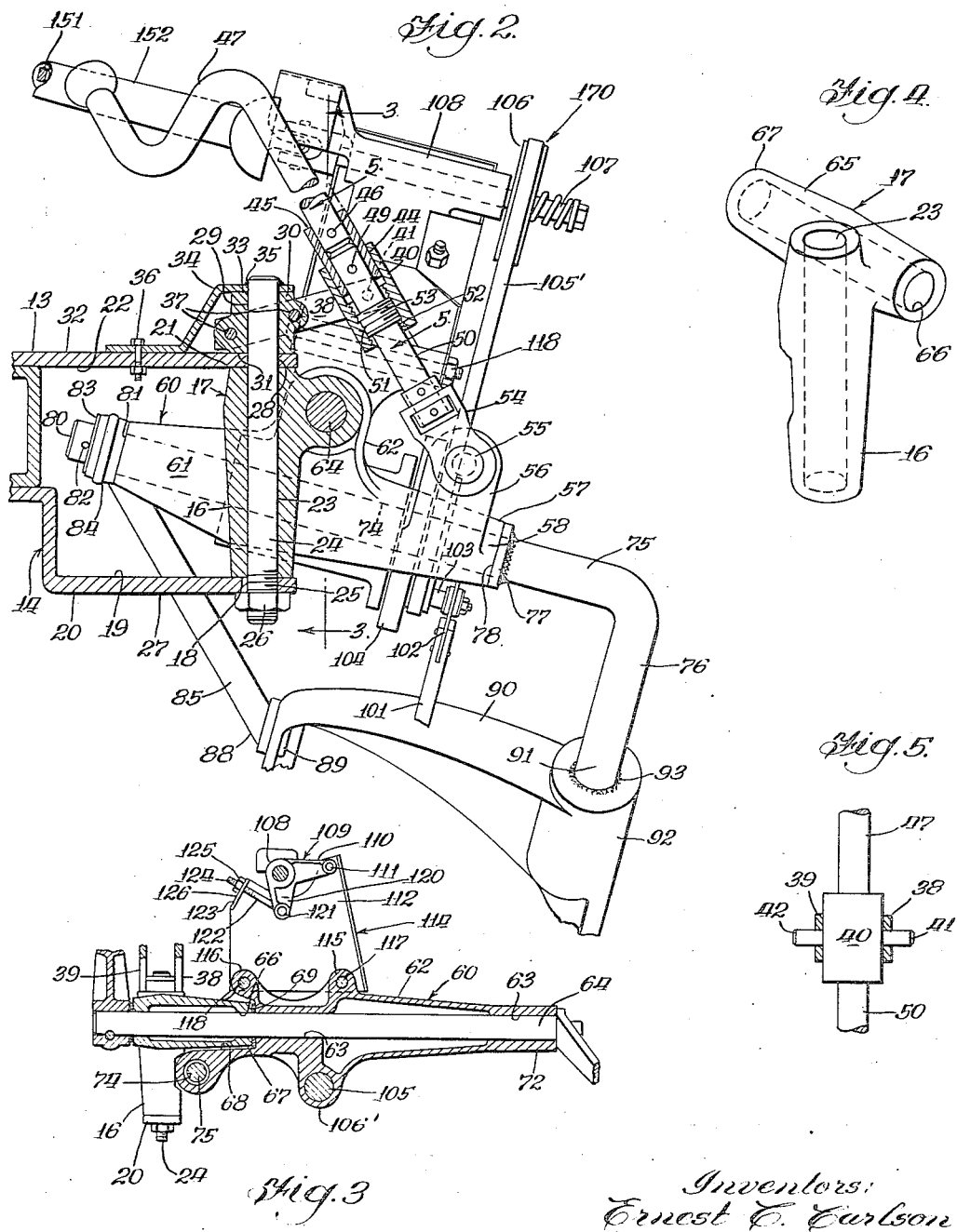

United States Patent Office 2,827,747
Patented Mar. 25, 1958

2,827,747
MOWER WITH TILTING MECHANISM

Ernest C. Carlson, Wheaton, and Edwin F. Huddle, Elmwood Park, Ill., assignors to International Harvester Company, a corporation of New Jersey Application June 20, 1955, Serial No. 516,568

8 Claims. (Cl. 56—25)

This invention relates to mowers and more particularly to a pitman driven type of a mower which incorporates a cutter bar with a reciprocating sickle.

A general object of the invention is to provide a novel adjustment for the mower bar for angling it with reference to the ground.

In mowers of the type under consideration the practice has heretofore been to provide for adjusting the mower bar with respect to the supporting frame structure about an axis extending longitudinally of the mower bar. An attempt was made to balance the drive for the sickle in at least one position of the mower bar and the various connections had to be made of necessity sufficiently loose and flexible between the pitman and the knife head so as to permit angling of the sickle with the mower bar. This type of a construction has the inherent fault that there is only one position in which the pitman and the knife are truly aligned with each other and in all other positions the pitman and the knife are misaligned and this, therefore, results in power consumption as well as the development of extremely destructive vibrations and the imposition of very high stresses on the parts.

A further object of the invention is to devise a mower support framework which will permit up and down floating movements of the mower bar and with the parts so arranged and disposed as to provide a strong structure of light-weight and simple design for ease in fabrication and assembly.

A more specific object of the invention is to devise a novel mower wherein the mower bar and its supporting framework are swingable rearwardly upon the mower bar hitting an obstruction, and wherein the drive for the mower bar is carried upon the mower framework so that it, as well as the framework and the mower bar, are tiltable about a transverse axis to accommodate adjustment of the mower bar at different angles with respect to the ground without misaligning the drive in any position of the mower bar.

These and other objects of the invention will become more apparent from the specification and the drawings, wherein:

Figure 1 is a plan view of a mower incorporating the invention and illustrated in association with a tractor fragmentarily shown;

Figure 2 is an enlarged fragmentary vertical sectional view taken substantially on the line 2—2 of Figure 1;

Figure 3 is a sectional view on a different scale taken substantially on the line 3—3 of Figure 2;

Figure 4 is a perspective view of the trunnion block mounting the mower frame from the support structure;

Figure 5 is a partial elevational and a partial sectional view on line 5—5 of Figure 2; and Figure 6 is a fragmentary sectional view taken on line 6—6 of Figure 1.

Referring now to the drawings, there is fragmentarily shown in Figure 1 a conventional tractor or ambulatory structure designated 2 which has a hitch frame 3 which is of the type shown and claimed in copending U. S. application No. 338,651, applicant John R. Orelind, filed February 25, 1953, for Tractor Attaching Structure, now U. S. Patent No. 2,776,613, and which forms no part of the present invention except to show a mounting for the mower main frame 4 which includes a pair of fore and aft extending tongues or beams 5 and 6 which are socketed releasably in holders 7 and 8 at the trailing ends of the legs 9 and 10 of the hitch frame. The members 5 and 6 are interconnected by a cross beam 11 intermediate their ends and at their rear ends are interconnected by a second channel-shaped cross beam 12 which is oblique to the line of travel, it being observed that the member 6 is shorter than the member 5 as well shown in Figure 1. Top and bottom jaw members in the form of plates 13 and 14 are weld connected to the top and bottom sides respectively of the members 11 and 12 adjacent the left hand side of the frame structure, as viewed from the rear end of the harvesting machine. The jaw members 13 and 14 extend rearwardly of the rear beam 12 and receive a vertical tubular bearing portion 16 of a T-shaped trunnion member generally designated 17. The bearing portion 16 seats at its lower end as at 18 against the upper face 19 of a downwardly offset jaw portion 20 of the lower jaw member 14, and the upper end of the bearing portion 16 abuts as at 21 against the under side 22 of the top jaw member 13. The bearing portion 16 is provided with a vertical bore 23 receiving a pin or pivot member 24 therethrough, the lower end of the pin 24 being threaded and extending through an aperture 25 in the jaw portion 19 and having a nut 26 threaded thereon and engaging the under side 27 of said portion 20. The upper end of the pin 24 projects through an aperture 28 in the jaw portion 13 and extends through a bore 29 in an anchoring bearing block 30 which seats at its bottom end as at 31 against a top side 32 of the jaw member 13 and the upper end of the block 30 seats as at 33 against the under side of a clamp member 34 which is weld connected as at 35 to the upper end of the pin 24, the holder 34 being offset downwardly and connected as by a bolt and nut assembly 36 to the plate portion 13 and thus retaining the pin 24 in assembly with the block 30 and the trunnion member 17.

The bearing block 30 is connected as by rivets 37 to corresponding forward ends of a pair of rearwardly extending connecting or mounting straps 38 and 39 which with their rear ends flank a nut member 40 and pivotally mount the same on pins or pivots 41, 42 which are formed integral with the nut 40 whereby the nut 40 is pivotal on a generally horizontal axis transverse to the direction of travel of the unit.

The nut 40 has an internal bore 44 which slidably rotatably receives at its upper a sleeve 45, said sleeve having its upper end connected by a pin 46 to the lower end of a crank member 47 for rotation thereby. The lower end of the sleeve 45, which forms an effective guide for the crank with respect to the nut, is connected as by pin or rivet 49 to the upper end of a threaded adjusting member 50 which adjacent to its upper end is provided with threads 51 which cooperate with threads 52 in the threaded lower end portion 53 of the nut 40. The lower end of the adjusting member 50 is rotatably connected to a clevis 54 which is pivoted by a pin 55 on a generally horizontal axis to an upstanding ear 56 which is formed integral with the rear extremity 57 of a rearwardly projecting arm or wing 58 of a cruciform shaped mower sub-frame member generally designated 60.

The member 60, which is generally T-shaped in plan, comprises the wing 58 and a coaxial wing 61 which forms the cross piece of the T and extend in a fore and aft direction, and the shank of the T is formed by the elongated tubular member 62. This casting 60 is provided with a bore 63 (Fig. 3), extending lengthwise through the portion 62, which receives a rockshaft 64 therethrough, the shaft 64 extending through a bore 66 in the horizontal bearing portion 65 of the trunnion member 17, the bearing portion 65 being disposed crosswise of and formed integral intermediate its ends with the upstanding bearing portion 16 and positioned therebehind. The bearing portion 65 is of fusiform construction and at one end 67 fits into a pocket 68 which is formed in the inner end of the shank portion 62 of the T-shaped member 60 and in abutment therewith along radial surfaces through a washer 69 (Fig. 3) whereby said member 60 is rotatable about the horizontal axis of the shaft 64 relative to the member 17, and is swingable on a substantially vertical axis of the pin 24 with said member 17.

The grassward end 72 of the shank portion 62 of member 60 is supported on a ledge 73 (Fig. 1) in the operative position of the mower and the ledge extends rearwardly from beneath the juncture of the beam members 5 and 12 of the frame structure 4 and preferably weld connected therewith.

The wing portions 58 and 61 have a common axial bore 74 therethrough, through which extends and is journaled a fore and aft extending end portion 75 of a transversely extending coupling bar or arm 76. The end portion 75 has an abutment in the form of a washer 77 weld connected thereto adjacent to its rear end which abuts with the rear end 78 of the wing portion 58 and the forward end 80 of portion 75 projects out of the forward end 81 of the wing portion 61 and is provided with a pin 82 which, with a washer 83, retains the bearing end 84 of a drag link 85 against the edge 81. It will be observed that the drag link 85 and the coupling arm 76 provide a mounting structure and are pivotal on a fore and aft extending common axis to accommodate floating movement up and down of the mower generally designated 87.

The outer or grassward end 88 of the drag link 85 is connected as by riveting at 89 (Fig. 2) to the forward wall of the yoke structure 90 and the yoke structure is connected to the grassward or outer end 91 of the coupling arm through a socket portion 92 along the rear edge of the yoke 90, the socket 92 telescoping over the end 91 of the coupling arm 76, and preferably weld connected as at 93.

The yoke assembly is hinged as at 94 and 95 on a horizontal fore and aft extending axis to the inner end structure comprising a shoe 96 of the mower assembly 87, the inner shoe being connected to the cutter bar 97 in conventional manner as well understood by those skilled in the art and reciprocably supporting a sickle cutter or knife 98 which is pivotally connected as at 99 to the outer or grassward end of the pitman 101 which at its inner or stubbleward end 102 is rotatably connected to a crank or wrist pin 103 on a counterweighted flywheel pulley 104 which is rotatably supported on a shaft 105, Figure 3, and the shaft 105 being supported within a depending lug structure 106' formed integral with the under side of the shank member 62 of the cruciform structure 60. The element 104 is driven by a belt 105' trained thereabout and the belt being driven by a wheel or pulley 106 which is connected to a shaft 107 in usual manner, the shaft 107 being supported in a fore and aft direction in a bearing structure 108 which is formed at the elbow of a bell crank adjusting member 109 (Fig. 3). The bell crank 109 has a generally horizontally extending leg portion 110 (Fig. 3) which is pivoted on a fore and aft axis 111, as by a bolt, which passes through front and rear plates or supports 112 and 113 of a box-like carrier member 114, the front and rear plates 112 and 113 being spaced in a fore and aft direction and embracing a pair of upstanding lug structures 115 and 116 formed integral with portion 62 and along their lower edges being connected thereto as by bolts 117 and 118 passing therethrough (Figs. 2 and 3).

The other leg 120 of the bell crank support and adjusting member 109 for the shaft of the driving pulley extends downwardly and at its lower end is pivotally connected as at 121 to an eye of an adjusting bolt 122 which extends diagonally upwardly from the point 121 in a direction away from the pivot point 111 and passes through a cross piece or member 123 which is interconnected with the walls 112 and 113 of the carrier, said bolt or adjusting member 122 having a threaded end 124 on which is threaded a nut 125 which is adapted for engagement with the outer side 126 of the wall 123. It will be readily appreciated that threading the nut 125 on the bolt 122 tends to rotate the entire bell crank assembly 109 about the point 111 for consequent raising of the pulley wheel 106, whereby tightening the belt 105. It will be understood that the nut 125 may be of the self-locking type so that it will not loosen up in the vibration of the unit.

The mower 87 is retained in its normal operative position as shown in Figure 1 by means of a latch 130 which is of hook shape and hooks over the outer end portion 131 of the rockshaft 64, the latch 130 being pivoted on a transverse pin 132 on ears of a bracket 137 and is biased downwardly into latching engagement with the end portion 131 of shaft 14 by means of a spring 133 which is adjustably compressed between a nut 134 on a guide or retainer 135 which passes through an opposed abutment 136 formed on a bracket 137 which is carried and connected to the leg 5 of the frame structure 4. The spring 133 seats as at 138 against the abutment 136 in opposition to the nut 134 and constantly tends to urge the latch member 130 into latching engagement by rotation of the latch 130 downwardly through application of a force through the ears 140 which extend upwardly from the hook or latch member 130 as will be readily understood by those skilled in the art.

It will be appreciated that shaft 64 is rotatable about a horizontal transverse axis with respect to the latch member 130 without interference.

The shaft 107 is connected through a knuckle joint 150 to the rear end of a telescoping shaft assembly 151, which is shielded as by coverings 152 in the usual manner, and which connects to a power take-off shaft 155 extending from the rear end of the tractor 2 as will be readily understood by those skilled in the art.

The rockshaft 64 is connected at its grassward end to the rearwardly extending lever member or arm 156 which is connected through the usual linkage 157 to the inner shoe 96 of the mower assembly 87 for lifting and gagging the mower. The stubbleward end of rockshaft 64 is connected through the medium of an arm 158 and through a linkage including the resilient cabling 160 to suitable source of power 161 such as a piston and cylinder.

*Operation of device*

In operation when the mower is attached to the tractor, as shown in Figure 1, the operator may crank the handle 47 in either direction whereupon the entire structure, which includes the member 60 and the drive mechanism generally designated 170 and the gag and lifting arms 85 and 76, the mounting structure, the yoke structure carrying the inner shoe structure 96 and the mower assembly 87, will rotate about the axis of the shaft 64 but without in any way changing the alignment or disposition of the drives between the sickle, the pitman 102, and the crank member 104 or between the member 104 and the driving pulley wheel 106. All of the parts are thus maintained in constant alignment. In operation as the mower is proceeding along the field the mower assembly will move up and down about the axis of the end portion 75, the arms 76 and 85 swinging together about said axis. If the mower should hit an obstruction, the mower bar and the entire sub-frame or support structure generally designated 171 which includes the first portion 17 and the second portion comprising the coupling arm 76, the link 85, the member 60 and the tilt adjusting mechanism as well as the drive assembly 170, will swing rearwardly about the vertical axis of the pin 24, Figure 2, attendant to the latch 130 automatically releasing. To reengage, the operator merely backs the tractor whereupon there is a relative forward swinging movement of the mower structure and sub-frame assembly or supplementary frame structure 171 about the vertical axis of the pin 24 until the end 131 of the rockshaft slides under the hook latch 130 and throws it over center and locks therewith. Thereupon the operator proceeds with the cutting. It will be appreciated that the operator may adjust the tilt of the mower at any time by merely rotating the handle 47 in either direction.

What is claimed is:

1. In a mower, a main frame, a sub-frame assembly comprising a first portion pivotally connected to said main frame on a substantially vertical axis for swing back movement in a generally horizontal plane, a second portion, means pivotally supporting said second portion from said first portion for fore and aft tilting movement on a generally horizontal axis extending transversely to the operational direction of travel of the mower and for said swing back movement with said first portion, means operatively interconnecting said portions for selective angular fore and aft positioning of said portions relative to each other, a mowing machine comprising a cutter bar, described in its operative position extending generally parallel to said second-mentioned axis, means operatively connecting said cutter bar with said second portion for fore and aft tilting and swing back movement therewith and for vertical floating movement relative to said sub-frame on a substantially horizontal fore and aft extending axis, a sickle reciprocal on said cutter bar, and a drive transmission for the sickle entirely supported upon said second portion and including a pitman operatively connected at one end to said sickle, a crank assembly operatively connected to the other end of the pitman and mounted upon said second portion, and means including a jointed shaft drivingly connected to the said crank assembly and having means for connection to the power take-off of an associated tractor.

2. The combination according to claim 1 and said first-mentioned means comprising a rockshaft, and said third-mentioned means including a pivotal connection mounting said cutter bar for vertical swinging movement about a fore and aft extending axis spaced grasswardly from said first-mentioned fore and aft axis.

3. In combination a main frame having means for connection to an associated tractor in trailing relationship thereto, a supplementary frame structure behind the main frame and including first and second portions and means pivotally connecting said portions with each other for relative fore and aft tilting movement about a generally horizontal axis extending transversely of the direction of movement of the frame, means pivotally mounting said first portion on said mower frame on a generally vertical axis whereby said supplementary frame is bodily swingable in a substantially horizontal plane rearwardly of said main frame, a mowing machine comprising a cutter bar with a sickle reciprocal thereon and normally extending generally horizontally transversely to said direction of movement, mounting means pivotally connected to said cutter bar on a fore and aft extending axis and pivotally connected to said second portion on a fore and aft extending axis, power transmission means for driving said sickle solely supported upon said second portion and operatively associated with said sickle and including means comprising a shaft assembly with at least one universal joint and said shaft assembly extending in a fore and aft direction and having means for connection to the power take-off of the associated tractor, and means operatively interconnecting said portions for selective angular adjustment about said transverse axis relative to each other whereby concomitantly tilting said cutter bar and said power transmission means.

4. A mower having a mobile frame, a sub-frame having a first portion pivotally mounted on the frame on a generally vertical axis, a second generally horizontal portion tiltably mounted on the first portion on a generally horizontal axis and extending transversely to the direction of travel of the frame, means adjustably connecting said portions for setting the same in selected angular relation, a mower assembly including a mower bar and a sickle reciprocal thereon extending transversely of said direction, means connecting said mower assembly with said second portion for swinging movement therewith in a substantially horizontal plane upon the mower assembly striking an obstruction, and for tilting movement about said horizontal axis, and drive means for the sickle carried entirely upon said second portion and operatively connected to said sickle.

5. A mower having a frame, a sub-frame structure comprising a trunnion member pivotally mounted on the frame on a substantially vertical axis for accommodating swinging movement of the structure in a substantially horizontal plane and a T-shaped part having a transverse shank portion extending generally horizontally from one side of said trunnion member, means pivotally interconnecting and supporting said part at one end of said shank portion from said trunnion member, means pivotally supporting said part at the other end of said shank portion from said frame, said part having fore and aft generally coaxial wing portions connected to said shank portion, a mower assembly extending transversely of the direction of movement of the frame and including an inner end structure, means including a pair of elongated elements pivotally connected at one end on a common axis to respective wing portions and connected at their other ends to said inner end structure for accommodating upward swinging movement of the mower assembly with said elements about said axis of pivot thereof to said wing portions, drive transmitting means operatively connected to the sickle and entirely supported upon said part and having means for connection to an associated power source.

6. A mower having a frame adapted for mounting on an associated ambulatory structure, a support structure mounted thereupon for tilting movement with respect to said frame about a generally horizontal axis extending transversely to the direction of travel of the mower, means operatively associated with the frame and support structure for holding them in several selected fore and aft angular positions relative to each other, a mower assembly operatively connected to the support structure for bodily movement therewith about said axis, a carrier mounted on said support structure, drive means supported upon the carrier and including a jointed fore and aft shaft assembly adapted for connection to an associated power source, and said drive means operatively connected to said sickle, said drive means carried entirely upon said structure for bodily movement therewith.

7. In a mower, a main frame portion, a sub-frame including first and second portions disposed in side by side relation to each other transversely of the main frame member, means tiltably connecting said first and second portions on a generally horizontal axis extending transversely of the main frame portion, means pivotally connecting one of said portions of the sub-frame to said main frame portion on a substantially vertical axis for rearward swinging movement of the sub-frame relative to the main frame portion, a cutting mechanism comprising a cutter bar with a sickle reciprocally supported thereon extending grasswardly from said sub-frame, means connecting said cutter bar with said second portion of the sub-frame for fore and aft tilting movement therewith and for rearward swinging movement therewith upon said mower striking an obstruction, means releasably interlocking said sub-frame with said main frame portion against said swing back movement for holding said cutting mechanism in operative position, drive transmitting means carried by said second portion and operatively connected to said sickle, and means connecting said second portion of the sub-frame with one of the other said portions for selectively holding said second portion and said drive transmitting means and said cutting mechanism in a plurality of positions about said transverse axis.

8. The invention according to claim 7 and further characterized in that said means tiltably connecting said first and second portions comprises a rockshaft projecting through said first and second portions and said releasable interlocking means comprises a spring loaded hook latch pivoted on the main frame portion and hooked over said rockshaft whereby said rockshaft is turnable relative to said latch, and means connected to said rockshaft and to said cutter bar for lifting the cutting mechanism with attendant turning of said rockshaft.

References Cited in the file of this patent
UNITED STATES PATENTS

| | | |
|---|---|---|
| 2,504,686 | Hilblom | Apr. 18, 1950 |
| 2,637,966 | Richey | May 12, 1953 |
| 2,673,437 | Pollock et al. | Mar. 30, 1954 |
| 2,686,658 | Hill et al. | Aug. 17, 1954 |
| 2,700,860 | Barber | Feb. 1, 1955 |
| 2,743,568 | Elfes | May 1, 1956 |
| 2,757,504 | Elfes et al. | Aug. 7, 1956 |